United States Patent
Lischer

(10) Patent No.: US 9,482,239 B2
(45) Date of Patent: Nov. 1, 2016

(54) DIE-CAST DIFFUSER FOR A TURBOCHARGER

(75) Inventor: Thomas Lischer, Neustadt (DE)

(73) Assignee: BorgWarner Inc., Auburn Hills, MI (US)

( * ) Notice: Subject to any disclaimer, the term of this patent is extended or adjusted under 35 U.S.C. 154(b) by 273 days.

(21) Appl. No.: 13/511,351

(22) PCT Filed: Dec. 3, 2010

(86) PCT No.: PCT/US2010/058834
§ 371 (c)(1),
(2), (4) Date: May 22, 2012

(87) PCT Pub. No.: WO2011/084283
PCT Pub. Date: Jul. 14, 2011

(65) Prior Publication Data
US 2012/0269659 A1    Oct. 25, 2012

(30) Foreign Application Priority Data

Dec. 17, 2009 (DE) .................. 10 2009 058 747

(51) Int. Cl.
*F04D 29/42* (2006.01)
*F04D 25/04* (2006.01)
(Continued)

(52) U.S. Cl.
CPC ........... *F04D 29/4206* (2013.01); *F01D 25/24* (2013.01); *F02B 39/00* (2013.01); *F02C 6/12* (2013.01); *F04D 25/04* (2013.01); *F04D 29/441* (2013.01); *F04D 29/601* (2013.01);
(Continued)

(58) Field of Classification Search
CPC .......... F02C 6/12; F04D 25/04; F04D 29/02; F04D 29/401; F04D 29/403; F04D 29/4206; F04D 29/4226; F04D 29/441; F04D 29/545; F04D 29/547; F04D 29/601; F04D 29/541; F04D 29/40; F02B 39/00
USPC ....... 417/338, 375, 405, 406, 407, 409, 408; 415/911, 208.3, 208.4, 196, 197
See application file for complete search history.

(56) References Cited

U.S. PATENT DOCUMENTS 4,355,850 A * 10/1982 Okano ..................... 384/121
4,717,318 A * 1/1988 Elpern ..................... 417/407
(Continued)

FOREIGN PATENT DOCUMENTS

DE    102 60 042    * 8/2004 .............. F01D 9/00
GB    0724022.9     * 12/2007 ............. F01D 25/16
(Continued)

OTHER PUBLICATIONS

English Transation, DE 102 60 042, Espacenet.com; Patent Translate; Jun. 24, 2015; 6 pages.*

*Primary Examiner* — Charles Freay
*Assistant Examiner* — Timothy P Solak
(74) *Attorney, Agent, or Firm* — A. Michael Tucker; Stephan A. Pendorf; Patent Central LLC

(57) ABSTRACT

A compressor housing of an exhaust-gas turbocharger is formed as a pressure-die-cast housing to achieve cost reduction in relation to permanent-mold-cast housings. Since it is not possible in a pressure-die-cast housing to realize round transitions of the spiral in the direction of the housing rear side because this would prevent removal from a mold, the bearing-housing-side diffuser wall is formed as a separate component.

9 Claims, 2 Drawing Sheets

(51) Int. Cl.
  *F04D 29/60* (2006.01)
  *F01D 25/24* (2006.01)
  *F02B 39/00* (2006.01)
  *F02C 6/12* (2006.01)
  *F04D 29/44* (2006.01)
  *F02B 37/18* (2006.01)

(52) U.S. Cl.
  CPC .......... *F02B 37/18* (2013.01); *F05D 2220/40* (2013.01); *F05D 2230/21* (2013.01)

(56) References Cited

U.S. PATENT DOCUMENTS

| | | | |
|---|---|---|---|
| 4,927,712 A * | 5/1990 | Lhymn et al. | 428/614 |
| 5,327,725 A * | 7/1994 | Mitsubori | 60/605.2 |
| 6,193,463 B1 * | 2/2001 | Adeff et al. | 415/196 |
| 2004/0223847 A1 * | 11/2004 | Cvjeticanin et al. | 415/206 |
| 2004/0247462 A1 * | 12/2004 | Carter | F01D 17/143 417/407 |
| 2006/0110249 A1 * | 5/2006 | Williams et al. | 415/206 |
| 2007/0022575 A1 * | 2/2007 | Takahashi | 24/136 R |
| 2008/0193288 A1 * | 8/2008 | Anschel et al. | 415/208.2 |
| 2008/0292449 A1 * | 11/2008 | Lefevre | 415/58.4 |
| 2009/0290979 A1 * | 11/2009 | Ibaraki | F04D 29/4206 415/200 |

FOREIGN PATENT DOCUMENTS

| | | |
|---|---|---|
| JP | 62-041998 A | 2/1987 |
| JP | 06-074101 A | 3/1994 |
| JP | 2001-234753 A | 8/2001 |
| JP | 2009-281182 A | 3/2009 |

* cited by examiner

DIE-CAST DIFFUSER FOR A TURBOCHARGER

BACKGROUND OF THE INVENTION

1. Field of the Invention

The invention relates to an exhaust-gas turbocharger.

2. Description of the Related Art

Conventionally, the compressor housings of the compressors of an exhaust-gas turbocharger of this type are formed as permanent-mold-cast housings, which duly have the advantage that circular cross-sectional geometries can be realized, in particular in the region of the compressor spiral, but permanent-mold casting is an expensive production method.

BRIEF SUMMARY OF THE INVENTION

It is therefore an object of the present invention to provide an exhaust-gas turbocharger, the production costs of which are reduced but the efficiency of which is at least not reduced in relation to known designs.

This object is achieved by an exhaust-gas turbocharger having a turbine, and having a compressor which has a compressor housing, the compressor housing being fastened to a bearing housing and having a compressor spiral and a bearing-housing-side diffuser wall, wherein the compressor housing is formed as a pressure-die-cast housing, and the diffuser wall is formed as a separate component which can be connected to the compressor housing and which has an internal rounding in the transition region to the inner wall of the compressor housing spiral.

Since the compressor housing is formed as a pressure-die-cast housing, the desired cost reduction in relation to permanent-mold-cast housings is attained.

Since it is not possible in a pressure-die-cast housing to realize round transitions of the spiral in the direction of the housing rear side because this would prevent removal from a mold, the bearing-housing-side diffuser wall is formed as a separate component. This separate component may be connected to the compressor housing in a suitable way after the production of the latter. For this purpose, it is for example possible for the separate component, which may also be referred to as an inlay, to be placed in between a rear wall of the compressor and the compressor housing and clamped by means of the rear wall. It is alternatively possible for the clamping of the inlay part or diffuser wall to be performed by the adjoining wall of the bearing housing, which in this embodiment then simultaneously forms the rear wall of the compressor.

It is also possible for the bearing-housing-side diffuser wall, which is formed as a separate inlay part, to be adhesively bonded at the radial circumference and/or axially to the rear wall and/or to the bearing housing flange.

The inlay diameters may vary between the sealing sleeve outer diameter and compressor wheel outer diameter.

In order that it is not necessary to accept efficiency losses, the bearing-housing-side diffuser wall which is formed as a separate component is provided with an internal rounding in the region of the transition to the inner wall of the compressor spiral.

The subclaims relate to advantageous refinements of the invention

If the bearing-housing-side diffuser rear wall is formed as a plastic injection-molded part from heat-resistant plastic, thermal decoupling of the compressor from the bearing housing is additionally obtained. A further increase in efficiency by 1.5 to 2 percentage points is possible in this way.

BRIEF DESCRIPTION OF THE SEVERAL VIEWS OF THE DRAWINGS

Further details, advantages and features of the present invention wilt emerge from the following description of an exemplary embodiment on the basis of the drawing, in which:

FIG. 1 illustrates an exhaust-gas turbocharger 1 according to the invention, which is provided with a turbine 2 and a compressor 3. The turbine 2 and the compressor 3 are connected to one another via a bearing housing 4. In the bearing housing, a rotor shaft 5 is mounted, in the example, by means of a floating sleeve bearing arrangement 6, 7.

Figure 1:
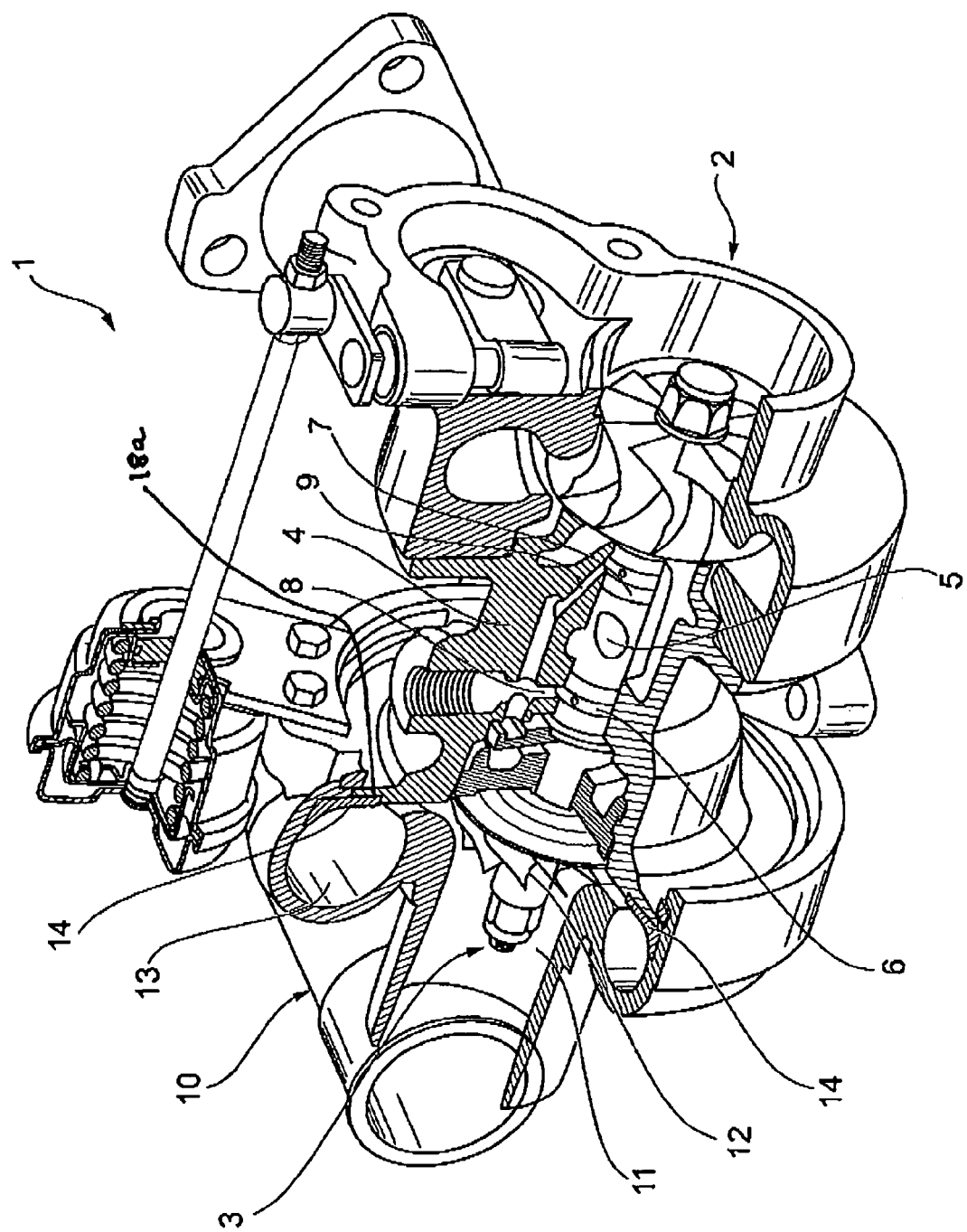
FIG. 1 shows a perspective sectional illustration of an exhaust-gas turbocharger according to the invention.

An oil supply line 8 and 9 ensures the lubrication of the bearing arrangement 6, 7.

The compressor 3 has a compressor housing 10, in the housing interior space 11 of which the compressor wheel 12 is arranged.

The compressor housing 10 also has a compressor spiral 13 which is provided, at the bearing housing side, with a housing rear wall or bearing-housing-side diffuser wall 14.

The design of the compressor housing 10 according to the invention will be explained in more detail below on the basis of FIG. 2. The compressor housing 10 is formed as a pressure-die-cast housing, which yields the advantages explained in the introduction, in particular with regard to the cost reduction. Since a pressure-die-cast housing of this type must be of open design in the region arranged adjacent to the bearing housing 4 in the assembled state, a separate component is provided as a bearing-housing-side diffuser wall 14, which separate component is placed into the finished compressor housing 10 after the pressure-die-casting production process and is fixed in a suitable way. As can be seen from the illustration of FIG. 2, in the region adjoining an inner wall 15 of the compressor spiral 13, the bearing-housing-side diffuser wall 14 is provided with a rounding 16 which runs from the inner wall 15 to an inner wall region 17, which runs straight and is perpendicular to this inner wall 15, of the bearing-housing-side diffuser wall 14, as can be seen in detail from the diagrammatic illustration of FIG. 2. As a result of the provision of a separately formed component of this type as a diffuser wall, it is possible to utilize the cost advantages of the pressure-die-casting process without any resulting efficiency losses, since the rounding 16 provides a round transition to the housing interior 11 of the compressor housing 10.

Figure 2:
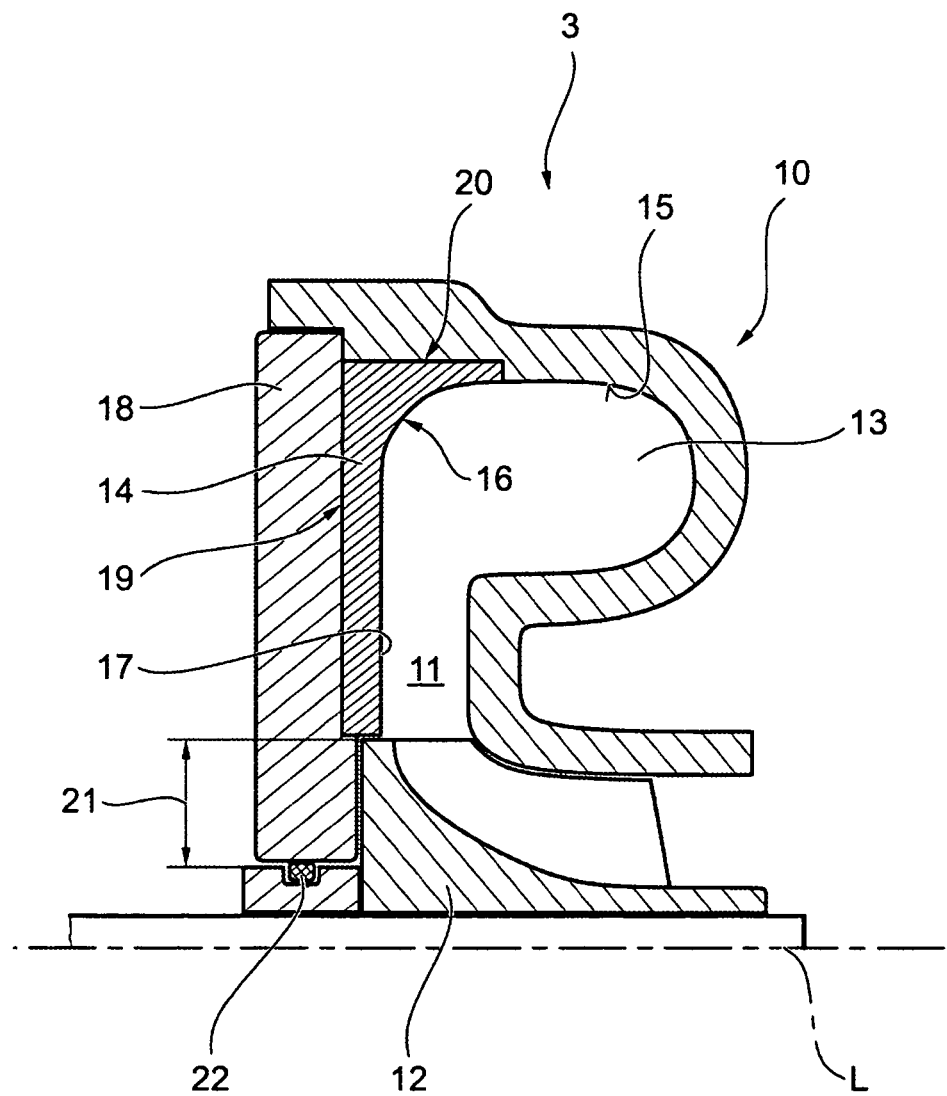
FIG. 2 shows a sectional illustration of one half of a compressor housing according to the invention.

As can also be seen from FIG. 2, the separate component or inlay 14 which forms the bearing-housing-side diffuser wall is placed into the open side of the compressor housing 10 after the production of the latter by pressure die casting, and in the example, said separate component or inlay 14 is clamped with the compressor housing 10 by means of the rear wall 18 of the compressor housing 10 or a flange of the bearing housing 18a (illustrated in FIG. 1).

The points 19 and 20 denote possible adhesive points, the point 19 representing an axial adhesive point with the wall 18 and the point 20 representing a radial adhesive point.

The inlay diameter range which is provided according to the invention is symbolized by the double arrow 21 in FIG. 2.

The fixing of the wall 18, preferably with the provision of a radial seal 22, may take place in the usual way, for example by means of a screw connection or a shrink fit.

In addition to the above written disclosure of the invention, reference is hereby made explicitly to the diagrammatic illustration thereof in FIGS. 1 and 2.

LIST OF REFERENCE SYMBOLS

1 Exhaust-gas turbocharger
2 Turbine
3 Compressor
4 Bearing housing
5 Rotor shaft
6, 7 Floating sleeve bearing arrangement
8, 9 Oil supply lines
10 Compressor housing
11 Housing interior space
12 Compressor wheel
13 Compressor spiral
14 Bearing-housing-side diffuser wall/Housing rear wall
15 Inner wall of the compressor spiral 13
16 Roundings
17 Straight inner wall of the bearing-housing-side diffuser wall 14
18 Rear wall of the compressor 3 or bearing housing wall or bearing housing flange
19 Axial adhesive point
20 Radial adhesive point
21 Inner diameter region
22 Seal
L Charger axis

The invention claimed is:

1. An exhaust-gas turbocharger (1) having
a turbine (2), and
a compressor (3) which has a metal compressor housing (10) having an inlet, said compressor housing (10) being fastened to a bearing housing (4) and having a compressor spiral (13) having an inner wall (15) on the compressor inlet side and a diffuser wall (14) on the bearing housing side,
wherein
the compressor housing (10) is formed as a pressure-die-cast housing,
the bearing-housing-side diffuser wall (14) is formed as a separate component connected to the compressor housing (10) and which has an internal rounding (16) in a transition region transitioning to the inner wall (15) of the compressor housing spiral (13),
the bearing-housing-side diffuser wall (14) is a plastic injection-molded part, and
the plastic injection-molded part has a side facing the bearing housing, wherein the side facing the bearing housing is completely backed by a metal wall (18, 18*a*) which is a structural component of the compressor housing or a structural component of the bearing housing.

2. The exhaust-gas turbocharger as claimed in claim 1, wherein the bearing-housing-side diffuser wall (14) is connected to the compressor housing (10) by means of positively locking connecting devices.

3. The exhaust-gas turbocharger as claimed in claim 2, wherein the bearing-housing-side diffuser wall (14) is clamped with the compressor housing (10) by means of a compressor housing rear wall (18).

4. The exhaust-gas turbocharger as claimed in claim 2, wherein the bearing-housing-side diffuser wall (14) is clamped with the compressor housing (10) by means of a bearing housing flange (18*a*).

5. The exhaust-gas turbocharger as claimed in claim 1, wherein the plastic bearing-housing-side diffuser wall (14), viewed in axial section, comprises
an inner wall region (17), which runs straight, and
a rounding (16) for transitioning flow to an adjoining inner wall (15) of the compressor spiral (13) of the compressor housing (10).

6. The exhaust-gas turbocharger as claimed in claim 1, wherein the plastic bearing-housing-side diffuser wall (14), viewed in axial section, comprises
an inner wall region (17), which runs straight, and
a rounding (16) which runs from the straight inner wall region (17) to a straight region perpendicular to the straight inner wall region (17) adjoining an inner wall (15) of the compressor spiral (13) of the compressor housing (10).

7. An exhaust-gas turbocharger (1)
having a turbine (2), and
having a compressor (3) which has a metal compressor housing (10), said compressor housing (10) being fastened to a bearing housing (4) and having a compressor spiral (13) having an inner wall (15) and a bearing-housing-side diffuser wall (14),
wherein
the compressor housing (10) is formed as a pressure-die-cast housing,
the bearing-housing-side diffuser wall (14) is formed as a separate plastic component which can be connected to the compressor housing (10) and which has an internal rounding (16) in a transition region to the inner wall (15) of the compressor housing spiral (13),
the bearing-housing-side diffuser wall (14) is a plastic injection-molded part,
the plastic injection-molded part has a side facing the bearing housing, wherein the side facing the bearing housing is completely backed by a metal wall (18, 18*a*) which is a structural component of the compressor housing or a structural component of the bearing housing,
and
the bearing-housing-side diffuser wall (14) is adhesively bonded at least one of axially and radially to the compressor housing (10).

8. The exhaust-gas turbocharger as claimed in claim 7, wherein the plastic bearing-housing-side diffuser wall (14), viewed in axial section, comprises
an inner wall region (17), which runs straight, and
a rounding (16) for transitioning flow to an adjoining inner wall (15) of the compressor spiral (13) of the compressor housing (10).

9. The exhaust-gas turbocharger as claimed in claim 7, wherein the plastic bearing-housing-side diffuser wall (14), viewed in axial section, comprises
an inner wall region (17), which runs straight, and
a rounding (16) which runs from the straight inner wall region (17) to a straight region perpendicular to the straight inner wall region (17) adjoining an inner wall (15) of the compressor spiral (13) of the compressor housing (10).

* * * * *